(12) United States Patent
Larson et al.

(10) Patent No.: US 8,857,705 B2
(45) Date of Patent: *Oct. 14, 2014

(54) METHODS FOR EMBEDDING DEVICE-SPECIFIC DATA TO ENABLE REMOTE IDENTIFICATION AND PROVISIONING OF SPECIFIC DEVICES

(71) Applicants: Kurt T. Larson, Plymouth, MN (US); Eugen Feraru, Prior Lake, MN (US); Michael Tilstra, Apple Valley, MN (US); Mark Benson, Plymouth, MN (US); Matthew Tilstra, Rogers, MN (US); Matthew Hilden, Robbinsdale, MN (US); Nick Klein, Coon Rapids, MN (US); Scott A. Nelson, Eagan, MN (US)

(72) Inventors: Kurt T. Larson, Plymouth, MN (US); Eugen Feraru, Prior Lake, MN (US); Michael Tilstra, Apple Valley, MN (US); Mark Benson, Plymouth, MN (US); Matthew Tilstra, Rogers, MN (US); Matthew Hilden, Robbinsdale, MN (US); Nick Klein, Coon Rapids, MN (US); Scott A. Nelson, Eagan, MN (US)

(73) Assignee: Logic PD, Inc., Eden Prairie, MN (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/739,435

(22) Filed: Jan. 11, 2013

(65) Prior Publication Data

US 2013/0193203 A1  Aug. 1, 2013

Related U.S. Application Data

(60) Provisional application No. 61/640,162, filed on Apr. 30, 2012, provisional application No. 61/586,470, filed on Jan. 13, 2012, provisional application No. 61/586,439, filed on Jan. 13, 2012, provisional application No. 61/586,397, filed on Jan. 13, 2012, provisional application No. 61/586,385, filed on Jan. 13, 2012, provisional application No. 61/586,368, filed on Jan. 13, 2012.

(51) Int. Cl.
*G06F 17/00* (2006.01)
*H04W 76/02* (2009.01)
*H04W 8/26* (2009.01)
*H04W 4/00* (2009.01)

(52) U.S. Cl.
CPC .............. *H04W 76/02* (2013.01); *H04W 8/265* (2013.01); *H04W 4/003* (2013.01)
USPC ..................................... 235/375; 235/462.13

(58) Field of Classification Search
CPC .................................................... G06K 17/00
USPC ...................................... 235/375, 487, 462.13
See application file for complete search history.

(56) References Cited

U.S. PATENT DOCUMENTS 5,870,667 A * 2/1999 Globuschutz ................. 455/419
6,012,088 A   1/2000 Li et al.

(Continued)

*Primary Examiner* — Paultep Savusdiphol
(74) *Attorney, Agent, or Firm* — Winthrop & Weinstine, P.A.

(57) ABSTRACT

The invention provides systems and methods for providing a unified single-scan user interface for accessing and managing a remotely located device throughout its life cycle, including cellular network provisioning, cloud data provider registration, initialization and activation, as well as providing end users with easy access to the device and its data. The end user simply powers the device on and the device automatically connects with the communication network and the cloud data provider. The device comes to the end user already provisioned and paired and activated with the cloud data provider and the communication network provider. Device-specific data is, at manufacture, encoded onto machine-readable labels and complied in a table within a remote database. The present invention thus allows identification and provisioning of individual devices using a mobile device such as a smartphone or the like.

18 Claims, 10 Drawing Sheets

(56) References Cited

U.S. PATENT DOCUMENTS

| | | |
|---|---|---|
| 6,259,367 B1 | 7/2001 | Klein |
| 6,330,977 B1 | 12/2001 | Hass et al. |
| 6,662,221 B1 | 12/2003 | Gonda et al. |
| 6,845,097 B2 | 1/2005 | Haller et al. |
| 6,973,095 B1 | 12/2005 | Carrel et al. |
| 7,055,737 B1 | 6/2006 | Tobin et al. |
| 7,069,113 B2 | 6/2006 | Matsuoka et al. |
| 7,146,159 B1 | 12/2006 | Zhu |
| 7,222,791 B2 | 5/2007 | Heilper et al. |
| 7,284,208 B2 | 10/2007 | Matthews |
| 7,336,175 B2 | 2/2008 | Howarth et al. |
| 7,352,853 B1 | 4/2008 | Shen et al. |
| 7,353,017 B2 * | 4/2008 | Chen et al. ................. 455/414.2 |
| 7,447,751 B2 | 11/2008 | Wing et al. |
| 7,496,349 B1 | 2/2009 | Gailloux et al. |
| 7,548,746 B2 | 6/2009 | Kalke |
| 7,634,551 B2 | 12/2009 | Tredoux et al. |
| 7,779,125 B2 | 8/2010 | Wyngarden |
| 7,861,009 B2 | 12/2010 | Skinner |
| 7,865,140 B2 * | 1/2011 | Levien et al. ................. 455/41.2 |
| 7,885,858 B2 | 2/2011 | Mehta et al. |
| 7,912,426 B2 | 3/2011 | Masera et al. |
| 7,962,629 B2 | 6/2011 | Bigioi et al. |
| 8,041,782 B1 | 10/2011 | Crow et al. |
| 8,046,581 B2 | 10/2011 | Netanel |
| 8,050,242 B2 | 11/2011 | Lipford et al. |
| 8,091,772 B2 | 1/2012 | Sherman et al. |
| 8,131,888 B2 | 3/2012 | Skinner |
| 8,200,736 B2 | 6/2012 | Shi et al. |
| 8,204,536 B2 | 6/2012 | Franklin et al. |
| 8,245,934 B1 * | 8/2012 | Tam et al. ................. 235/462.11 |
| 8,276,197 B1 | 9/2012 | Mangal et al. |
| 8,280,009 B2 | 10/2012 | Stepanian |
| 8,335,503 B1 | 12/2012 | Desmond et al. |
| 8,370,439 B2 | 2/2013 | Chang et al. |
| 2005/0010417 A1 | 1/2005 | Holmes |
| 2005/0125664 A1 | 6/2005 | Berkema et al. |
| 2007/0123166 A1 | 5/2007 | Sheynman et al. |
| 2008/0061979 A1 | 3/2008 | Hause et al. |
| 2008/0113618 A1 | 5/2008 | De Leon et al. |
| 2009/0108057 A1 | 4/2009 | Mu et al. |
| 2009/0234702 A1 | 9/2009 | Chester |
| 2009/0287498 A2 * | 11/2009 | Mr. Choi, Yu ................. 705/1 |
| 2009/0287499 A1 | 11/2009 | Link, II |
| 2009/0319640 A1 * | 12/2009 | Kugel ................. 709/220 |
| 2009/0319673 A1 | 12/2009 | Peters |
| 2010/0080383 A1 | 4/2010 | Vaughan et al. |
| 2010/0115279 A1 | 5/2010 | Frikart et al. |
| 2010/0167696 A1 | 7/2010 | Smith et al. |
| 2010/0192212 A1 | 7/2010 | Raleigh |
| 2010/0319064 A1 | 12/2010 | Warrier |
| 2011/0154375 A1 * | 6/2011 | Helal et al. ................. 719/320 |
| 2011/0219427 A1 | 9/2011 | Hito et al. |
| 2011/0248826 A1 | 10/2011 | Criel et al. |
| 2011/0265151 A1 | 10/2011 | Furlan et al. |
| 2011/0314163 A1 | 12/2011 | Borins et al. |
| 2012/0015604 A1 | 1/2012 | Abratowski et al. |
| 2012/0023410 A1 | 1/2012 | Roth et al. |
| 2012/0040658 A1 | 2/2012 | Netanel |
| 2012/0102487 A1 | 4/2012 | Cahill et al. |
| 2012/0105629 A1 | 5/2012 | Colciago |
| 2012/0182939 A1 * | 7/2012 | Rajan et al. ................. 370/328 |
| 2012/0198221 A1 | 8/2012 | Tukol et al. |
| 2012/0208496 A1 | 8/2012 | Raleigh |
| 2012/0209750 A1 | 8/2012 | Raleigh |
| 2012/0209926 A1 | 8/2012 | Backholm et al. |
| 2012/0210391 A1 | 8/2012 | Raleigh |
| 2012/0214414 A1 | 8/2012 | Abel et al. |
| 2012/0214441 A1 | 8/2012 | Raleigh |
| 2012/0236729 A1 | 9/2012 | Heinz et al. |
| 2012/0239221 A1 | 9/2012 | Mighdoll et al. |
| 2012/0276872 A1 | 11/2012 | Knauth et al. |
| 2012/0286672 A1 | 11/2012 | Holland et al. |
| 2012/0289222 A1 | 11/2012 | Venkatachalam |
| 2012/0324061 A1 | 12/2012 | Parsons et al. |
| 2012/0324119 A1 | 12/2012 | Imes et al. |
| 2012/0331537 A1 | 12/2012 | Flynn et al. |
| 2013/0007280 A1 | 1/2013 | Aslam et al. |
| 2013/0007853 A1 | 1/2013 | Gupta et al. |
| 2013/0031224 A1 * | 1/2013 | Nachtrab et al. ................. 709/220 |

\* cited by examiner

METHODS FOR EMBEDDING DEVICE-SPECIFIC DATA TO ENABLE REMOTE IDENTIFICATION AND PROVISIONING OF SPECIFIC DEVICES

RELATED APPLICATION

This application claims the benefit of U.S. Patent Provisional Application Nos. 61/586,368, 61/586,385, 61/586,439, 61/586,397 and 61/586,470 all filed Jan. 13, 2012, and 61/640,162 filed Apr. 30, 2012, the entire contents of each of which are hereby incorporated by reference.

BACKGROUND OF THE INVENTION

1. Field of the Invention

The invention relates generally to systems, devices and methods for improved provisioning, automatic network joining and easy access and management of remotely networked devices.

2. Description of the Related Art

Machine-to-Machine (M2M) communication device provisioning and device setup is quite complex today, with limited functionality, from an end user perspective. Generally, known systems require the end user to interact with each node, manually provision with a data service, manually establish user and security credentials, and manually connect with a data repository or database. Simplification of this process is one of several objectives of the present invention.

Systems and methods exist that use unique device information encoded on labels, e.g., quick response (QR) codes for providing interactive applications and services to a user via, e.g., mobile devices. Known mobile devices such as a smartphone comprise a scanner to scan the QR code of the labeled object. Typical applications use the QR code or data or the QR code to direct to a specific URL. QR codes are currently used in broader contexts spanning commercial tracking applications, such as tracking parts in vehicle manufacturing processes, and convenience-oriented applications targeting mobile device users. See U.S. Pat. No. 5,726,435 for disclosure of two-dimensional optically readable codes, the entire contents of which are hereby incorporated by reference.

Other machine-readable labels, i.e., scannable codes, relating to an information topic about a particular product or device exist. For example, bar codes, Microsoft TAG or other label on a device comprising unique device information are known in the art.

The types of information typically encoded on known machine-readable labels may comprise data such as serial number(s) or other unique identification data for a product, device and/or individual components or subcomponents, Media Access Control (MAC) address, and the like.

Known exemplary solutions are in U.S. Pat. No. 7,055,737 to Tobin, US application 2009/0287498 to Choi, U.S. Pat. No. 7,779,125 to Wyngarden and U.S. Pat. No. 7,912,426 to Masera, the disclosures of which are hereby incorporated in their entirety.

What is not known in the art are systems or methods that provide, inter alia, a unified single-scan user interface for accessing and managing a remotely located device throughout its life-cycle, including cellular network provisioning, cloud-data provider registration, initialization and activation, as well providing end users easy data access relating to the device.

BRIEF SUMMARY OF THE INVENTION

The invention provides systems and methods for providing a unified single-scan user interface for accessing and managing a remotely located device throughout its life cycle, including cellular network provisioning, cloud data provider registration, initialization and activation, as well as providing end users with easy access to the device and its data. The end user simply powers the device on and the device automatically connects with the communication network and the cloud data provider. The device comes to the end user already provisioned and paired and activated with the cloud data provider and the communication network provider. Device-specific data is, at manufacture, encoded onto machine-readable labels and complied in a table within a remote database. The present invention thus allows identification and provisioning of individual devices using a mobile device such as a smartphone or the like.

The figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

Figure 1:
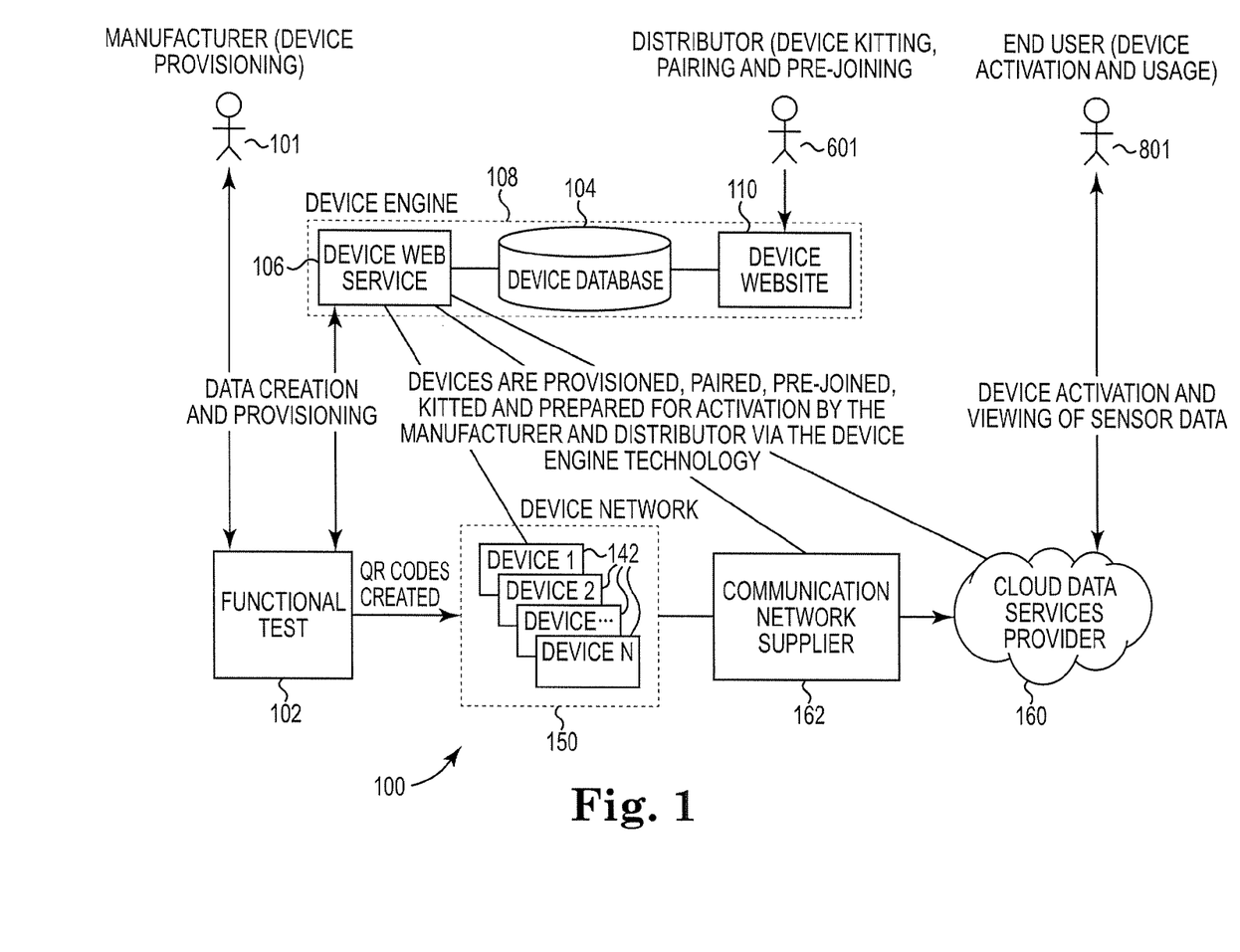
FIG. 1 is a schematic of one embodiment of the present invention.

FIG. 1 illustrates a system level diagram of one embodiment of the present invention. The inventive system 100 begins with manufacture of at least one exemplary manufactured device, e.g., a sensor without limitation, at a manufacturing facility 101.

"Device" as that term is used herein is defined as a structure that communicates between two or more networks and may comprise gateways, nodes and that may be controlled or monitored remotely including, without limitation, monitoring conditions such as with a sensor, controlling functionality and device characteristics, and actuating or de-actuating device functionality(ies).

The exemplary system 100 comprises a manufacturing software tool as is well known to the skilled artisan and which performs functional testing 102 on an exemplary manufactured device such as, without limitation, a sensor device, at the site of the manufacturer 101 of the device. The manufacturing tool's functional testing 102 comprises testing of the function of the exemplary manufactured device as well as the capability of adding the manufactured device to a device database 104 via a device web service 106. The device database 104 and device web service 106 are, as illustrated, located within a device engine 108.

The functional test 102 comprises actual device testing, e.g., in the exemplary case of a temperature sensor testing is conducted to determine the sensitivity and range, e.g., of the device as well as the functionality of the device's radio modem or other network connectivity mechanism. In addition, the functional test 102 comprises registration or addition of the device's identification data, including unique data such as the device's serial number, as well as non-unique data, if present, to the device database 104 via the device web service 106 of the device engine 108. In addition to the serial number of the device, the functional test 102 may also register or add additional device identification data, such as model type or number, and/or radio modem address and/or mobile equipment identifier (MeID), as well as the unique identifier mapped to the QR code.

The device web service 106 is in operative communication with the manufacturing tool and with the functional test 102 and receives thereby the results of the functional testing 102, in addition to one or more servers which are well known in the art and therefore not shown in the illustration. In addition, the device engine 108 comprises a device website 110 in operative communication with the device database 104 which is, in turn, in operative communication with the device web service 106. Device website 110 comprises a webpage to which the identification label, e.g., a QR code, resolves when scanned as is well known in the art. Device website 110 has a webpage URL encoded by the exemplary QR code to which the QR code resolves to as well known in the art once scanned by a distributor 601 or customer, end user 801 with, e.g., a smartphone or other similar device having scanning capabilities and connectivity to the internet.

Initially, the device's status at this stage of manufacture is Unassigned as it relates to the cloud data provider 160 and Unassigned as it relates to its communication network supplier 162. As defined herein, communication network supplier may supply communications comprising one or more of the following categories:

(1) wide area networks (WAN) comprising, for example and without limitation, wireless cellular networks and network providers and/or satellite uplinking networks and network providers;

(2) local area networks (LAN) comprising, for example and without limitation, wifi networks and network providers;

(3) personal area networks (PAN) comprising, for example and without limitation, Bluetooth networks and Bluetooth network providers and Near Field Communications (NFC) networks and NFC network providers, as well as ZigBee/802.15.4 as an exemplary communication class ; and (4) Ethernet.

The several states of the device and the transitions from state-to-state are described in further detail herein.

Once the exemplary manufactured device's information is added to the device database 104, the manufacturer then initiates generation of the identification label, in the illustrated case a QR code, for the device being manufactured. The QR code may contain unique and, in some case, non-unique data obtained during the manufacturing process and based on the identifier data provided to the device database 104 by the functional test process 102, via device web service 106. A preferred, but certainly not limiting, unique identifier data element for encoding on the QR code is the exemplary manufactured device's serial number.

The QR code may, in some cases, be assigned additional data as the device progresses through the later steps of distribution kitting and device activation.

The device engine 108, comprising device web service 106, device database 104 and device website 110, is in operative communication with, inter alia, the communication network provider 162 and the cloud data service provider 160 via operative communication with device web service 106 and the communication network provider 162 and cloud data service provider 160.

When the device is registered, or added to, the device database 104 via the device web service 106, by manufacturer 101, a scheduled job is provided in order to register or provision the device with the cloud data service provider 160 wherein the device engine 108, via device web service 106, instructs the cloud data provider 160 to add the exemplary manufactured device as, e.g., a serial number or other unique identifier. If registration or addition of the device's serial number or other unique identifier with the cloud data service provider 160 is successful, the device's status relative to the cloud data provider 160 moves from Unassigned to Assigned as Serial Number. This process occurs while the device is still within the factory or manufacturing facility 101.

The factory provisioning process concludes with provisioning of the exemplary manufactured device with both the cloud data provider 160 and the communication network provider 162. Thus, the device database 104 of device engine 108 also automatically activates, then suspends, the device's network radio modem by negotiating with the communication network provider 162. After successful negotiation with the communication network provider 162 in this activity, the device's network radio modem status, i.e., its network state, with the communication network provider 162 moves from Unassigned to Network Activated, then to Network Suspended pending action by the distributor 601 and the end user or customer 801. The device engine 108 coordinates and drives the factory provisioning process with the cloud data provider 160 and the communication network provider 162.

At this point, the device is factory provisioned and ready for further processing through the distributor 601 once an order from the end user or customer 801 is received. The device may remain at the manufacturer's factory facility until a customer order is received, at which point the device is transferred to the distributor 601. Alternatively, once the device is manufactured and the factory provisioning is complete, the device may be transferred to the distributor 601 to be stocked while waiting a customer or end user 801 order.

Generally, as illustrated in FIG. 1, once a customer or end user 801 order is received, the distributor 601 will initiate distribution kitting by scanning the identification label, e.g., the QR code previously developed and affixed to, and embedded within, the device. As discussed and as is known in the art, the QR code encodes a URL that comprises the device's identifier information, e.g., the device's serial number. Thus, when scanned by, e.g., a mobile device with scanning capability, e.g., a smartphone or the equivalent, the QR code resolves to a webpage on the device engine website 110 with a pointer to, e.g., the device's serial number. This webpage within device website 110 may also cause actions to be taken based on the device's status and provide feedback to the user 801.

As stated supra, when the distributor 601 first scans the device's QR code, the device pairing and activation activities are initiated relating to the communication network provider 162 and the cloud data service provider 160, taking advantage of the device's status following the factory provisioning process. The distribution kitting process is discussed further below.

Once the distribution kitting process is completed by the distributor, the device is activated with the communication network provider 162 and paired and activated with the cloud data service provider 160, the device's status is active with both the communication network provider 162 and with the cloud data services provider 160. A primary advantage is the resulting simplicity for the customer or the end user 801 who will only need to power the device on in order to enable the activated device 142 to automatically join the network and access relevant data.

Following shipment by the distributor of the activated device 142 to the user 801, the user 801 need only power the device 142 on. The activated device 142 may be a single networked device or may be one of several devices within, or added to, a device network 150 comprising more than one networked device. Each networked device, and the device network, is in operative communication with the device engine 108, including the device engine website 110, the device database 104, the device web service 106, the cloud data services provider 160, and the communication network provider 162. Thus, the activated device 142 and/or device network 150 may transmit and receive data from the device engine's website 110 and the cloud data services provider 160 to end user 801.

The activated device 142 may automatically connect with the communication network provider and the cloud data provider on the initial power up and/or each successive power up in certain embodiment of the present invention.

As a result, if, for example, and as illustrated, the customer or end user 801 wishes to scan the QR code specific for the activated device 142, or otherwise access the QR code embedded therein, the customer or user 801 may view the relevant data of the activated and operational device 142. In the exemplary case, the device 142 is, in addition to the definition of "device" provided above, a sensor, e.g., a temperature or humidity sensor, though many other devices are contemplated and within the scope of the present invention. In addition, other types of devices that may be manufactured and distributed to enable automatic joining of a network upon powering on comprise sensors for monitoring one of the group consisting of: tank level, liquid leakage, movement, speed (accelerometer) and vibration as are well known to the artisan. In addition, other types of devices amenable to the inventive system and methods described herein will readily present themselves to the skilled artisan. For example, and without limitation, devices amenable to the inventive system and methods described herein include devices for measuring distance, sound, pressure, voltage, current, speed, position, velocity, acceleration, weight, wavelength, frequency, period, duty cycle as well as determining whether a switch or circuit is open or closed. Each such device is within the scope of the inventive system and method.

Thus, generally, the present invention requires the subject product or device to be marked and/or embedded with unique encoded data, captured during the specific device's manufacturing process, to assist in identifying the particular product or device during the inventive process. Identification labels, for example and without limitation QR codes, Microsoft TAG solutions may be employed for this purpose.

Exemplary types of unique data that may be captured during the manufacturing process and used to populate the identification labels, e.g., QR code, comprise: Serial number(s) for the particular device or product, components or subcomponents thereof, identification data, media access control address (MAC), international mobile equipment identity (IMEI) data, subscriber identity module (SIM), machine-to-machine (M2M) identity module (MIM) data. Further, non-unique data may be encoded on an identification label, and/or embedded within the product or device such as, without limitation, product family identities, product data, brand data and fixed or variable uniform resource locator(s) (URL) data.

As discussed, FIG. 1 illustrates one embodiment of the present invention at a general system level. There are three basic component systems within the inventive system:

Manufacturing where device provisioning occurs;

Distribution, where device kitting, pairing and pre-joining occurs; and

End user, where device activation and use occurs.

Each of these three basic component systems comprising inventive system 100 will be discussed now in more detail.

Figure 2:
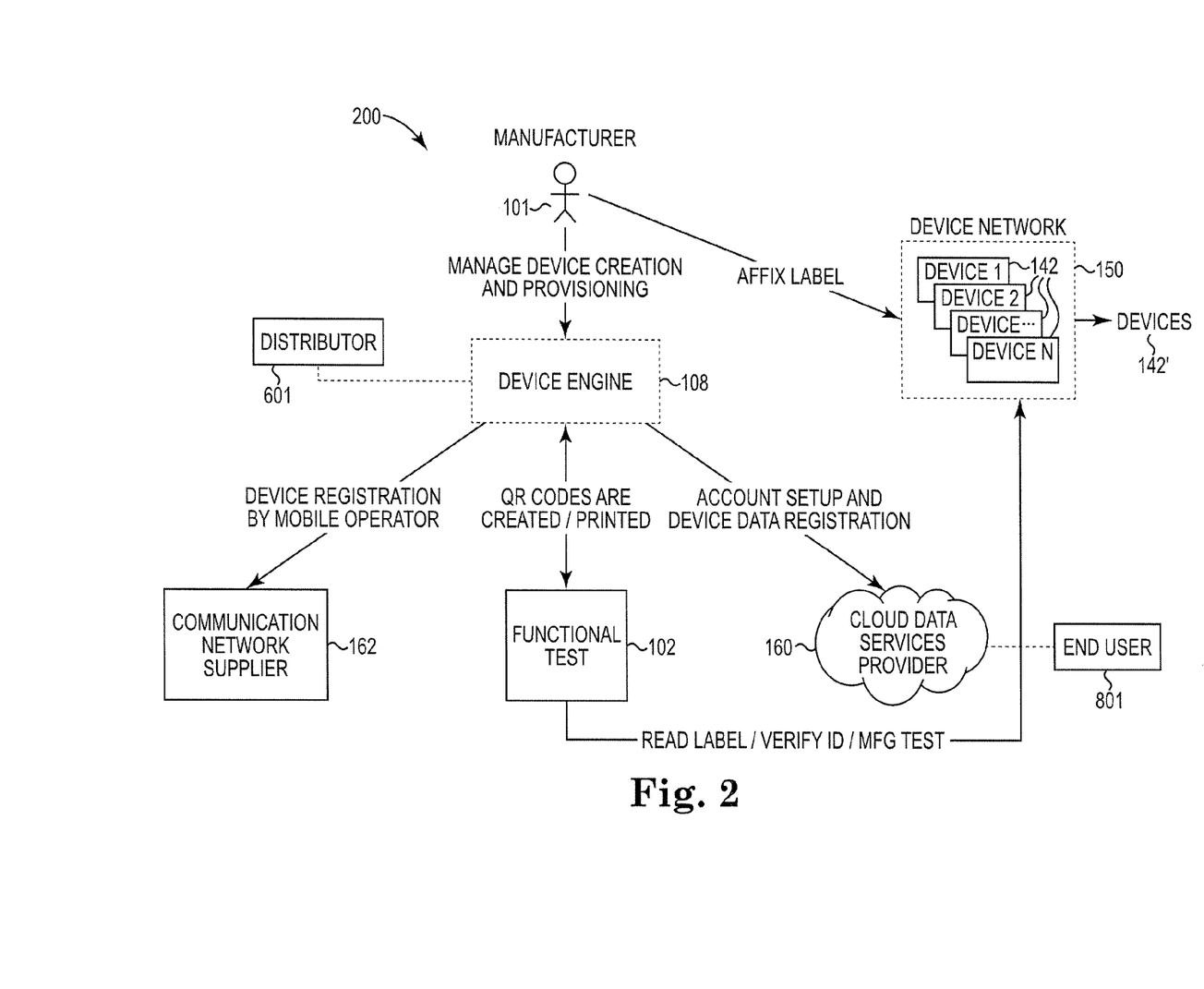
FIG. 2 is a schematic of one embodiment of the present invention.

Manufacturing Device Provisioning:

FIG. 2 thus illustrates one embodiment of the creation of the exemplary device and provisioning of that device by the manufacturer. We also refer to FIGS. 3, 4 and 5 which illustrate the states of the exemplary manufactured device in the provisioning process relating to the cloud data provider 160 and the cellular network provider 162.

Figure 3:
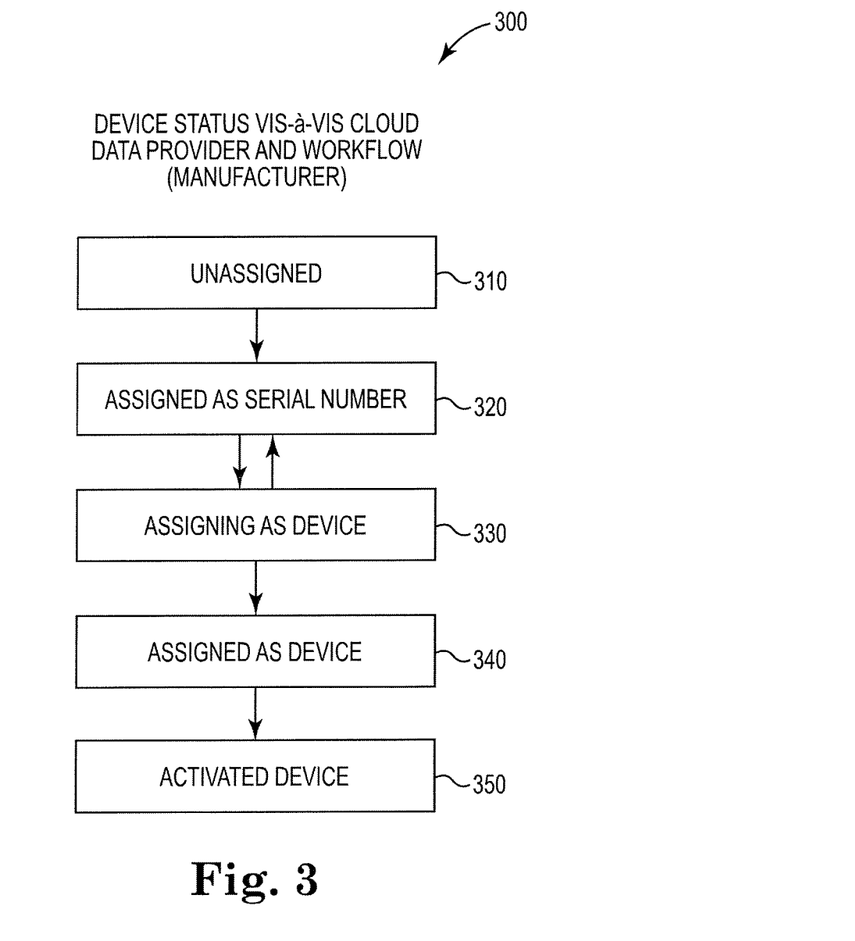
FIG. 3 is a flow diagram of one embodiment of the present invention.

With reference to FIGS. 1, 2 and 3, the exemplary device is, under the present invention, in one of the following five states 300 relative to the cloud data provider 162 at all times:

1. Unassigned 310. The unassigned state 310 is the state existing before, and during, the adding of the device into the device engine database 104 within device engine 108 as discussed above and which, when complete, triggers a pending request for subsequent registration of the device with the cloud data provider 160.

2. Assigned As Serial Number 320. The assigned-as-serial-number state 320 occurs when the device's serial number is registered with the cloud data provider 160. Thus, this state occurs following the establishment of the unassigned state 310 and execution of the pending request for registration of the device with the cloud data provider 160. If the device's serial number is unable to be registered with the cloud data provider 160 for any reason, the device's status returns to unassigned 310.

3. Assigning As Device 330. The assigning-as-device state 330 occurs as the device is being registered as a device during the distributing kitting process. A device enters this state by having its identification label, e.g., QR code, scanned for the second time. Such second scan of the exemplary QR code is performed by the distributor 601 during the distribution kitting process which will be discussed in greater detail below. Assigning As Device 330 is a transient state, dependent upon the success of the registration of the device; typically a device will remain in this state no longer than a few seconds.

4. Assigned As Device 340. The assigned-as-device state 340 occurs when the device is successfully registered with the cloud data provider 160. A device enters this state when the cloud data provider 160 provides a notification to the device engine 108 of the assigning-as-device 330 activity.

5. Activated Device 350. The activated state 350 occurs when the device has (1) been activated with the cloud data provider 160 and (2) its unique device identifying data is entered into the device database 104 within device engine 108.

The Unassigned 310 and Assigned-as-Serial-Number 320 states occur at the manufacturing site during a factory provisioning process. The remaining states, i.e., Assigning-as-Device 330, Assigned-as-Device 340 and Activated Device 350 states are initiated and completed by the distributor 601 or, alternatively, by the end user 801.

Figure 4:
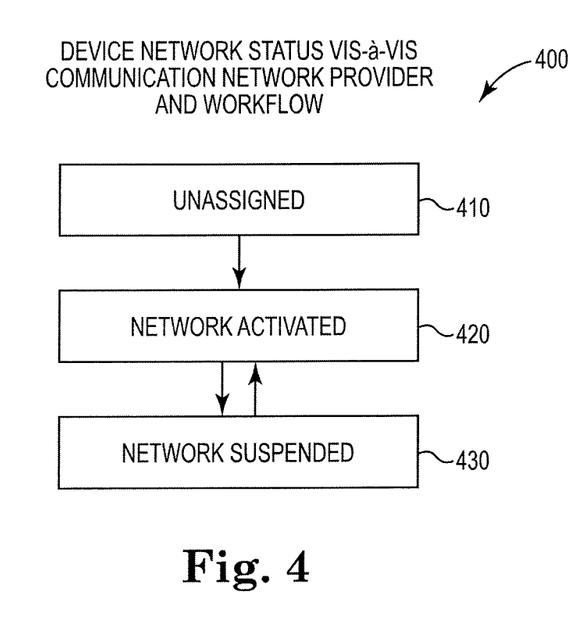
FIG. 4 is a flow diagram of one embodiment of the present invention.

The device in the present invention also comprises a radio modem as is well known in the art and which is always in one of three states 400 as illustrated in FIG. 4, with continued reference to FIGS. 1 and 2:

1. Unassigned 410. The device's radio modem is in the unassigned state 410 when the device is added to the device database 104 within device engine 108 by the manufacturer 101.

2. Network Activated 420. The device's radio modem is in the network-activated state 420 after the data plan is activated through the communication network provider 162. This occurs immediately after successful addition of the device to the device database 104 of the device engine 108 by the manufacturer 101.

3. Network Suspended 430. The device's radio modem is suspended in the network-suspended state 430. This suspension occurs immediately after successful network activation and is performed by manufacturer 101.

Figure 5:
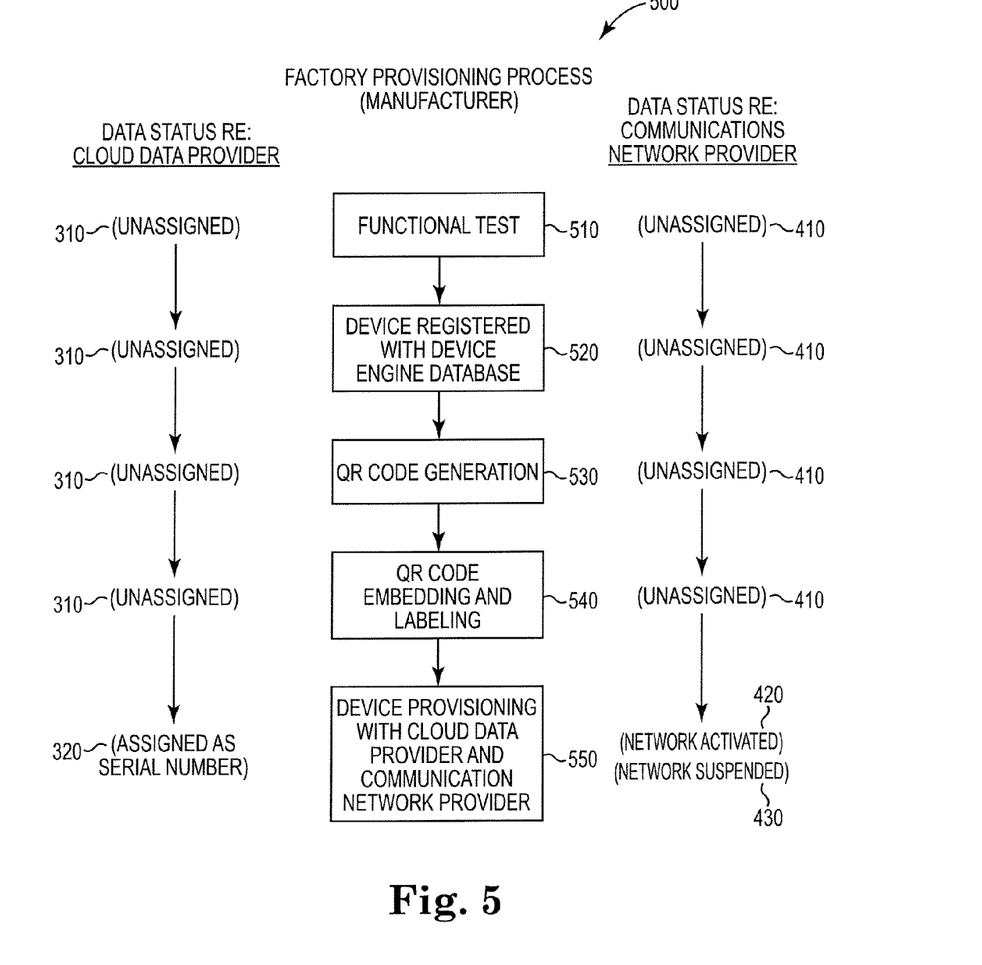
FIG. 5 is a flow diagram of one embodiment of the present invention.

As discussed briefly above, the exemplary manufactured device is provisioned during its manufacturing process, referred to herein as factory provisioning 500 as illustrated in FIGS. 1, 2 and 5, with continued reference to FIGS. 3 and 4. This process transforms a newly manufactured device into a fully network-activated device that is correctly configured to report data to the cloud data provider 160.

Factory provisioning 500 thus comprises a functional test process 510 which, inter alia, registers, or adds, the device with/to the device database 104 as shown in FIG. 1. The functional test process 510 registers the device's unique identifier data, e.g., serial number, model and/or radio modem address into the device database 104 in step 520. Initially, the device state as it relates to the cloud data provider 160 is Unassigned 310 and its radio modem network state is also Unassigned 410 as it relates to the communication network provider 162.

The manufacturer 101 next initiates generation of the QR code, or other labeling mechanism such as Microsoft TAG as described above in step 530. The QR code may be printed and affixed to the device for future scanning and data transmission and reception 540. The QR code is further embedded within the device to enable future communication and data transmission and reception 540. The functional test process embeds the QR code in the device. This allows the device, once deployed in the field, to query the device database 104 for its unique cloud data provider identifier, referred to hereinafter as "CIK", and which will be obtained during the device's distribution kitting process described in detail below.

The QR code is generated by the device database based on the unique identifier data provided to the device database 104 by the functional test process 510. The QR code may, preferably will, be assigned further data as the device progresses beyond manufacturing 101 through distribution kitting and device activation.

Registration, or addition, of the device with the device database 104 within device engine 108 also queues the device to be registered with the cloud data provider 160. A scheduled job is provided which automatically handles device provisioning with the cloud data provider 160.

The factory provisioning process 500 concludes with the device provisioning with both the cloud data provider 160 and the communication network provider 162 in step 550 and proceeds in two phases. First, device provisioning with the cloud data provider 160 occurs when the device engine 108 instructs the cloud data provider 160, via an automatic scheduled job, to add the device as a serial number to the cloud data provider's database records. If the serial number is successfully added to the cloud data provider 160, the device's status relative to the cloud data provider 160 after provisioning moves from Unassigned 310 to Assigned as Serial Number state 320. The device engine 108 also activates, and suspends, the network modem of the device by negotiating with the communication network provider 162. Thus, the device's radio modem state, i.e., its network state, with the communication network provider 162 moves from Unassigned 410, to Network Activated 420 and Network Suspended 430.

Figure 6:
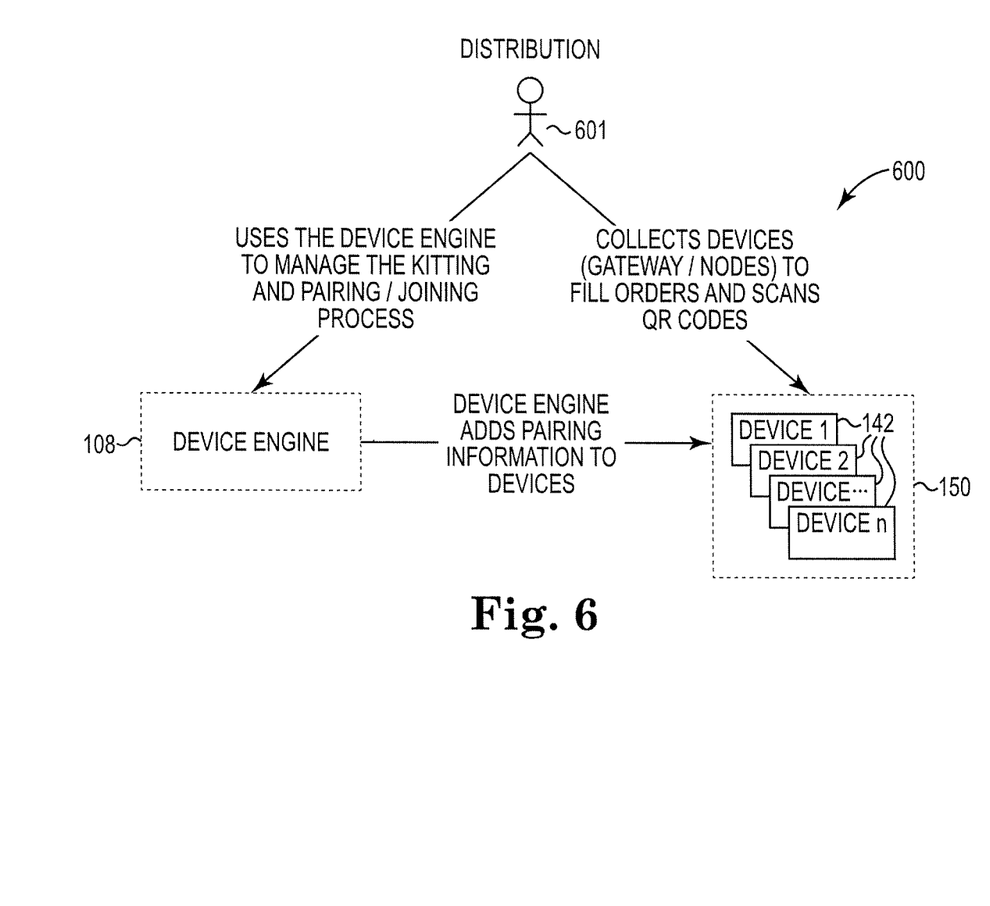
FIG. 6 is a schematic of one embodiment of the present invention.
Figure 7:
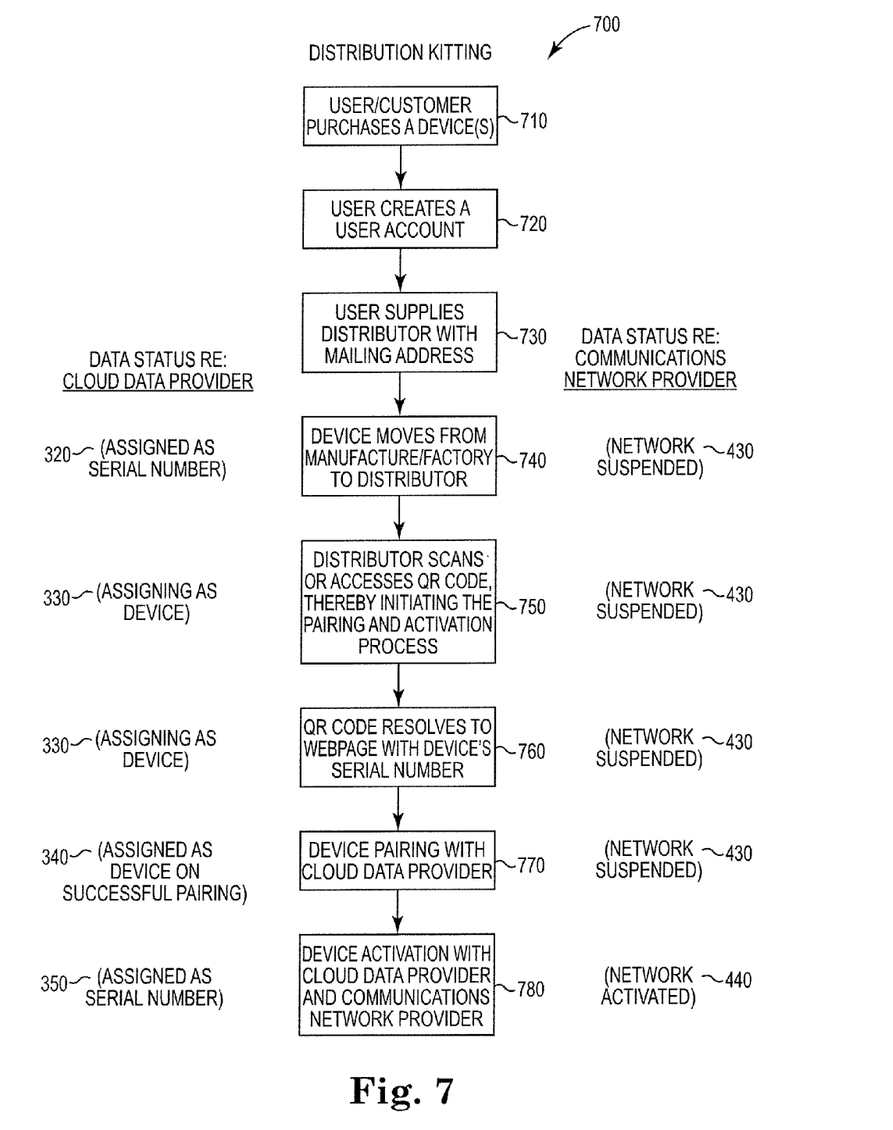
FIG. 7 is a flow diagram of one embodiment of the present invention.

Distribution Kitting:

We now refer to FIG. 6, within continued reference to FIGS. 1-5 to describe the system level distribution kitting, pairing and pre-joining processes occurring at the distributor 601. Following the factory provisioning process described above, the exemplary manufactured device moves from the manufacturer 101 to the distributor 601 where, in response to a customer or end user 801, order, the distribution kitting process 600 occurs, which (1) pairs the device with a specific user account, (2) activates the device with the cloud data provider 160 and (3) activates the device with the communication network provider 162. Scanning the device's QR code is the primary method for transitioning the device from state to state through the distribution kitting process 600. FIGS. 6 and 7 illustrate one embodiment of this process 600, 700 in flow chart form.

The customer or end user 801, purchases a device which, as discussed above may comprise a gateway, from the distributor 601 in step 710 and creates a user account with the cloud data provider 160 in step 720. The distributor 601 only needs the customer's mailing address for shipment of the device 730 once the user account has been created.

Once an order is received by a customer 801 and a customer account created 710, 720, the device moves from the manufacturing facility or factory to the distributor 740. An alternative embodiment comprises shipping the device from the factory to the distributor 740 in bulk and the distributor 740 waits for a customer order to send off a single set, or sets, of devices. The distributor 601 then scans the identification label, e.g., QR code that is affixed on the device in step 750, thereby initiating the pairing and activating process. This QR code encodes a URL that includes the device's serial number. As discussed, the QR code, scanned by a device comprising well known software for this purpose, resolves to a webpage on the device engine website with a pointer to its serial number in step 760. This webpage will cause appropriate action(s) to be taken based on the status of the device and provide feedback to the user.

When the distributor first scans the device's QR code, the pairing and activating processes are initiated in step 750. By the time the end user receives the device after purchase, all that is require to access the data is to power on the device.

In this way, device pairing with the user's account with the cloud data provider is accomplished as part of the distribution kitting process 700 by scanning the device's QR code.

After this scan of the device's QR code and resolution of the QR code to the webpage with the device's serial number 750, 760, the device status relative to the cloud data provider 160 is moved from Assigned as Serial Number 320, as the device's state was following the factory provisioning process discussed above, to Assigning as Device 330. Assigning As Device 330 is a transient state, indicating that the software is negotiating with the cloud data provider 160. The cloud data provider 160 will indicate success or failure of process with a callback. If no response is received by the distributor 601 from the cloud data provider 160, the device's software reverts back to the Assigned as Serial Number state 320.

If the device is successfully paired with the user's account with the cloud data provider 160, the cloud data provider 160 will invoke a callback to the device engine 108 and the device's state moves to Assigned as Device 340. The device engine 108 will then instruct the cloud data provider 160 to (1) activate the device, and (2) obtain the device's unique cloud data provider identifier or CIK, an element well known in the art. The CIK is, as described above, stored in the device's engine database 104. If the activation of the device is successful, the device's state relative to the cloud data provider 160 changes from Assigned as Device 340 to Activated Device 350. If activation fails, the status of the device remains Assigned As Device 340 and the failure tracked.

The communication network provider 162 is also called by the distributor 601 to activate the device on the cellular wireless network, moving the device from Network Suspended 430 to Network Activated 420 as illustrated in the Figures.

The device is now ready to be shipped to the end user 801 for joining the device network and is fully provisioned and activated with respect to both the wireless network provider 162 and the cloud data service provider 160.

Figure 8:
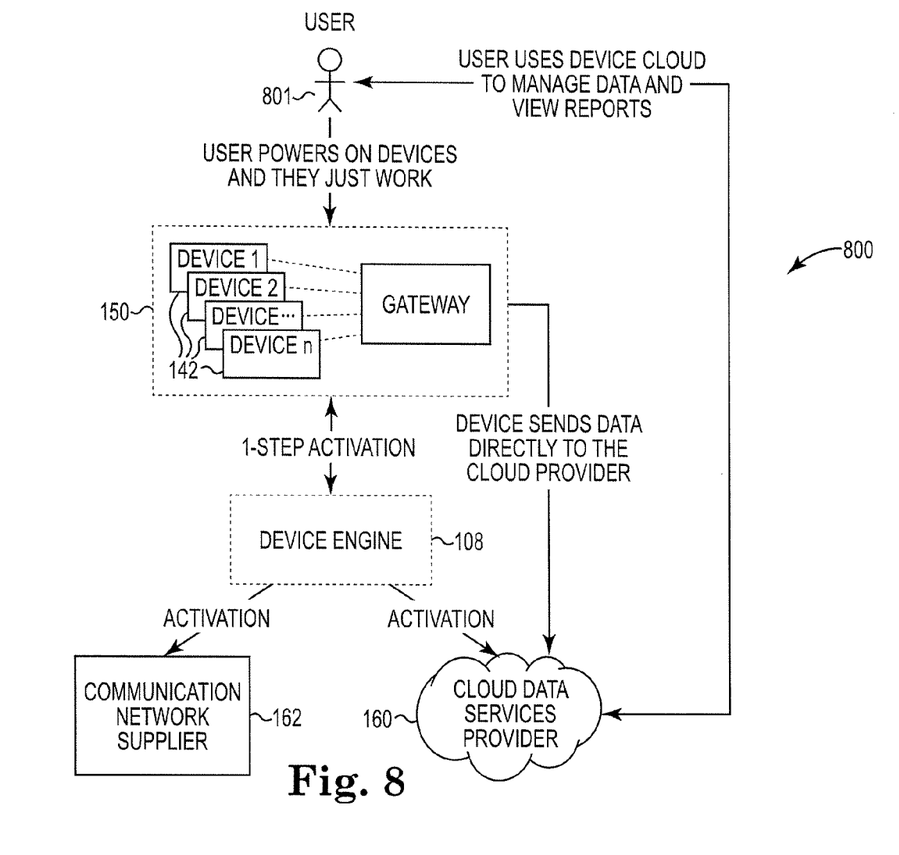
FIG. 8 is a schematic of one embodiment of the present invention.
Figure 9:
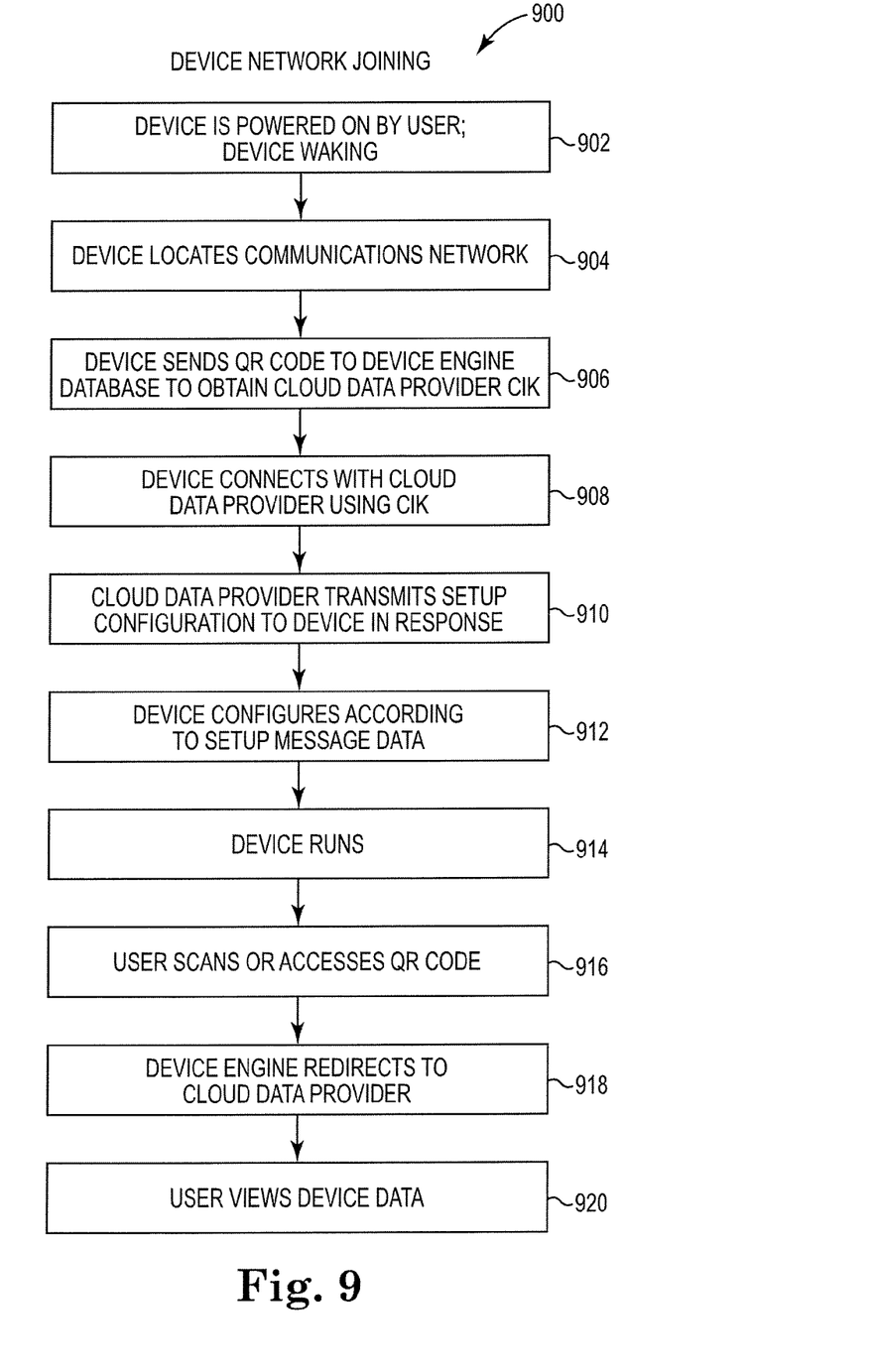
FIG. 9 is a flow diagram of one embodiment of the present invention.

Device Activation and Network Joining by User:

FIG. 8 illustrates one system level embodiment of the device activation and network joining process 800 while the process is illustrated in flow chart form in FIG. 9. When the device is powered on by user 801 and wakes up 902, it locates a gateway in its local wireless network 904 using techniques known to the skilled artisan. This allows the new device to join an existing gateway in the field. It is a possibility that the device may break up an existing pairing between it and a previous gateway in the field, based on signal quality.

Having obtained wireless, cellular, network connectivity via the gateway 904, the device connects to the device engine to obtain its cloud data provider CIK by sending its QR code to the cloud data provider 906, 908. These steps in the inventive process allows for the device to connect to the previously created user account with the cloud data provider 160, to which it was previously paired via the CIK during the distribution kitting process described above.

Thus, the device connects to the cloud data provider 160 using its cloud data provider CIK to retrieve its configuration message for setup 908. The cloud data provider 160 transmits in response a setup configuration message to the device 910. Based on the setup message transmitted from the cloud data provider 160 to the device, the device configures itself to conform with the setup message parameters and instructions 912. In the case of a remote sensing device, e.g., a temperature monitor, the temperature monitor is configured to conform with the parameters and instructions contained within the setup message such as maximum/minimum temperature, reporting frequency and other parameters dictating the type and frequency of the message being transmitted from the device to the cloud data provider 160. At this point the device is operational and runs within the network 914.

Figure 10:
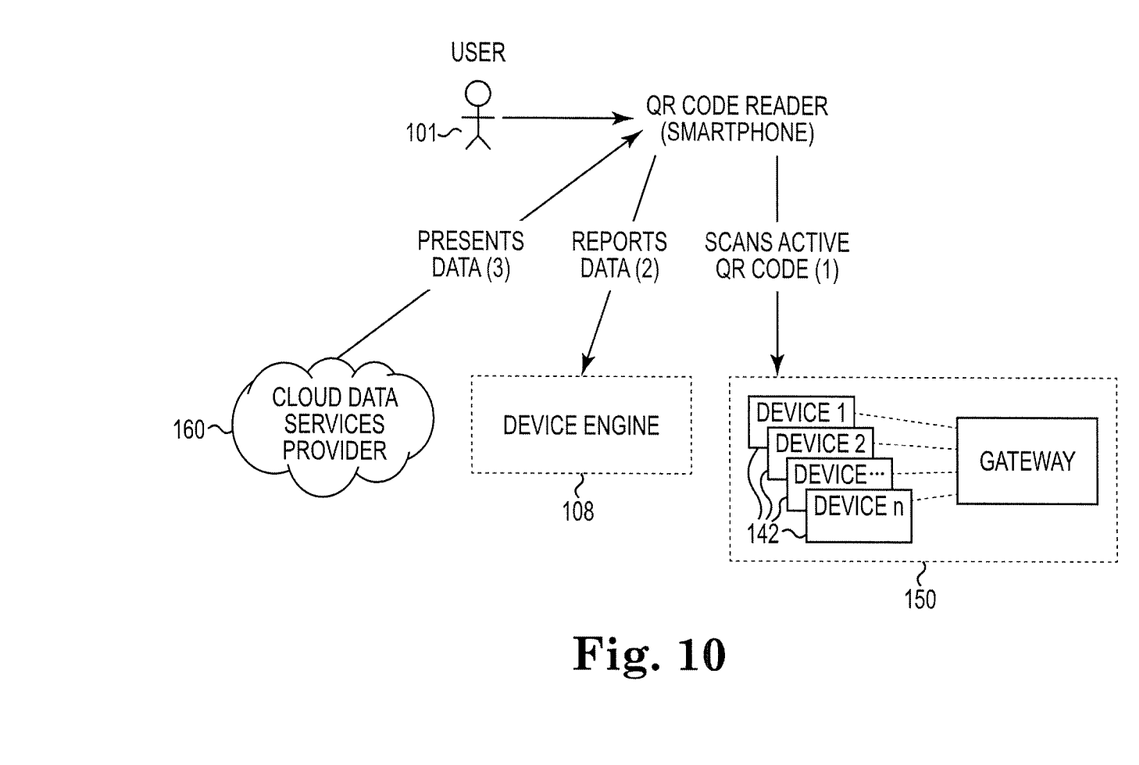
FIG. 10 is a schematic of one embodiment of the present invention.

Once a device is activated, its QR code can still be scanned by, e.g., the customer or end user 801 in order to, inter alia, allow the end user 801 to obtain data from the device as illustrated in FIG. 10. In this case, the webserver will redirect its URL to the cloud data provider 160 in step 918 where the customer or end user may view its device's data 920.

The device of the inventive system and method may be of various types, e.g., gateway devices comprising both cellular network, e.g., CSMA, GSM, as well as local area wireless network, capabilities. The gateway devices provide connectivity to the device engine website as well as the cloud data provider, via the cellular network radio modem.

Another device embodiment may comprise sensor nodes which have only local area wireless network capabilities. Sensor node devices read sensor data and leverage the gateway devices, as pass through communications means, for connecting to the device engine website as well as the cloud data provider, via the cellular network radio.

The inventive manufacturing and distribution process enable pairing sensor node devices to gateways in the factory/manufacturing and distribution channel so that when the customer or end user powers the devices up they begin working without further interaction or steps required by the customer. Further, a customer may select both the number and type of sensor nodes at the time of purchase and the device engine will pair the purchased devices with the gateway during kitting. Thus, the customer may configure the sensor-gateway combination at the time of purchase yet only needs to power on and scan the devices to access the data.

In various embodiments of the present invention, it is possible to use a mobile device, e.g., a smartphone or other device having internet access and scanning capability, to identify, then provision, one or more devices manufactured according to the above disclosure. More specifically, product-specific information or data obtained at the point of manufacture for individual devices is captured, compiled in a table located in a database, and encoded on known machine-readable identification labels. Such identification labels may comprise, e.g., QR codes, Microsoft TAG solutions and the like.

Using this process, it is thus possible under the present invention, to specifically identify a specific individual manufactured device according to the above disclosure from the table located in the remote database by scanning the identification label, e.g., QR code or Microsoft TAG, on the manufactured device with a mobile device such as a smartphone or the like. Once the specific desired device is identified, the identified device may then be remotely provisioned as described herein based on the specific encoded information or data in the identification label and table.

Exemplary types of unique data that may be captured during the manufacturing process and used to populate the identification labels, e.g., QR code, comprise: Serial number(s) for the particular device or product, components or subcomponents thereof, identification data, media access control address (MAC), international mobile equipment identity (IMEI) data, subscriber identity module (SIM), machine-to-machine (M2M) identity module (MIM) data. Further, non-unique data may be encoded on an identification label, and/or embedded within the product or device such as, without limitation, product family identities, product data, brand data and fixed or variable uniform resource locator(s) (URL) data.

Under this embodiment of the present invention, the encoded information or data on the identification label may be also compiled in a table, wherein the table resides in a remote database accessible by internet via scanning an identification label with the remote device, e.g., a smartphone. The QR code, Microsoft TAG, or equivalent, once scanned, allows the user to view a URL, i.e., webpage, that allows the device associated with the scanned identification label to be provisioned remotely based on the specific encoded information. Such provisioning may comprise, without limitation, powering up whereby the remote device then automatically joins an end user's communication network and a cloud data services provider, automatically joins a device network and/or is in automatic communication with the communication network and cloud data services provider as discussed supra.

In addition, a device manufactured under the present invention may comprise provisioning that allows a remote mobile device to actuate, power up, power down, modify parameters, and monitor real time operational data relating to, or controlled by, the manufactured device, or monitor real time environmental data within which the device is deployed, e.g., physical and/or chemical levels, for example temperature, humidity, carbon monoxide levels, tank levels and the like, within sensing range of the manufactured device. Moreover, once the environmental data levels have been sensed by the manufactured device, the mobile device, e.g., smartphone, may be used to control relevant elements on the manufactured device in order to adapt to or maximize performance of the manufactured device under the prevalent sensed environmental data levels.

Further, it is possible, once the real time operational data has been obtained for the manufactured device, to use the mobile device, e.g., smartphone, to modify or adjust the manufactured device in order to modify or adjust the manufactured device's operational data output, e.g., to bring the operational data into compliance or simply adjust the output to desired levels.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A method for specifically identifying a remotely located device and then provisioning the identified device with a mobile device having internet access and scanning capability, comprising:
   manufacturing a device with at least one network radio modem;
   providing provisioning and activation of the device with a communication network provider during the manufacturing and distribution process;
   providing provisioning and activating of the device with a cloud data services provider during the device manufacturing and distribution process;
   providing pairing of a user's account relating to an end user with the cloud data services provider during the manufacturing and distribution process;
   automatically joining the device with the cloud data services provider and the provisioned and activated communication network provider upon power up by the end user;
   obtaining device-specific data for the manufactured device;
   embedding the device-specific data obtained on an optically scannable identification label;
   attaching the optically scannable identification label to the manufactured device;
   entering the device-specific data in a database;
   scanning the identification label with the mobile device to identify the manufactured device in the database; and
   provisioning the identified manufactured device with the mobile device.

2. The method of claim 1, wherein the provisioning comprises powering up the identified manufactured device on and thereby enabling the identified manufactured device to automatically join with a device network.

3. The method of claim 2, wherein the provisioning comprises remotely monitoring the device with the mobile device after powering up the manufactured device.

4. The method of claim 1, wherein the provisioning comprises remotely controlling the manufactured device with the mobile device after power up.

5. The method of claim 1, further comprising remotely actuating or de-actuating the manufactured device after power up.

6. The method of claim 1, wherein the provisioning comprises actuating or deactuating one or more elements within the identified manufactured device with the mobile device.

7. The method of claim 1, wherein the provisioning comprises remotely monitoring the manufactured device with the mobile device after power up.

8. The method of claim 1, wherein the provisioning comprises remotely monitoring the environment within which the manufactured device is deployed with the mobile device.

9. The method of claim 8, wherein the provisioning comprises remotely monitoring physical and/or chemical parameters within the environment with the mobile device.

10. The method of claim 1, wherein the provisioning comprises powering the identified manufactured device off with the mobile device.

11. The method of claim 1, wherein the communication network comprises one of the group consisting of wide area network, local area network, personal area network and ethernet network.

12. The method of claim 11, wherein the wide area communication network comprises a wireless cellular network and/or a wifi network.

13. The method of claim 11, wherein the local area network comprises a satellite uplink network.

14. The method of claim 11, wherein the personal area communication network comprises a Bluetooth network, a ZigBee network, a 802.15.4 network, and/or a Near Field Communication network.

15. The method of claim 1, wherein the optically scannable identification label comprises a QR code.

16. The method of claim 1, wherein the optically scannable identification label comprises Microsoft TAG.

17. The method of claim 1, wherein the mobile device comprises a smartphone.

18. A method for specifically identifying a remotely located device and then provisioning the identified device with a mobile device having internet access and scanning capability, comprising:
   manufacturing a device with at least one network radio modem;
   providing provisioning and activation of the device with a communication network provider during the manufacturing and distribution process, wherein the communication network comprises one of the group consisting of wide area network, local area network, personal area network and ethernet network,
   wherein the wide area communication network comprises a wireless cellular network and/or a wifi network, wherein the local area network comprises a satellite uplink network, and wherein the personal area communication network comprises a Bluetooth network, a ZigBee network, a 802.15.4 network, and/or a Near Field Communication network;
   providing provisioning and activating of the device with a cloud data services provider during the device manufacturing and distribution process;

providing pairing of a user's account relating to an end user with the cloud data services provider during the manufacturing and distribution process;

automatically joining the device with the cloud data services provider and the provisioned and activated communication network upon power up by the end user;

obtaining device-specific data for the manufactured device;

embedding the device-specific data obtained in an identification label, wherein the identification label is selected from the group consisting of QR code and Microsoft TAG;

attaching the identification label to the manufactured device;

entering the device-specific data in a database;

scanning the identification label with the mobile device to identify the manufactured device in the database; and provisioning the identified manufactured device with the mobile device.

* * * * *